Patented Dec. 5, 1944

2,364,106

UNITED STATES PATENT OFFICE 2,364,106

HYDROCARBON CONVERSION

Ernest Solomon, Nutley, Herbert J. Parsino, Jersey City, and Louis C. Rubin, West Caldwell, N. J., assignors to The M. W. Kellogg Company, Jersey City, N. J., a corporation of Delaware No Drawing. Application September 6, 1941, Serial No. 409,894

7 Claims. (Cl. 260—683.5)

This invention relates to the isomerization of hydrocarbons by contact thereof with catalytic material comprising carbon black in combination with a suitable halide catalyst for the isomerization reaction. More particularly, the invention relates to the conversion of paraffin and cycloparaffin hydrocarbons to desired isomers thereof by contact of such hydrocarbons with catalytic material comprising carbon black in combination with a halide catalyst which is solid at room temperature. Still more particularly, the invention relates to the treatment of straight-chain or slightly branched-chain paraffin hydrocarbons by contact thereof with such catalytic material to produce branched-chain or more highly branched-chain paraffin hydrocarbons.

The catalysts employed in the present invention in combination with the carbon black comprise suitable metal halides or mixtures of metal halides with hydrogen halides. For example, the halides of aluminum, zirconium, tantalum, iron and tin may be employed. The halides of aluminum such as aluminum bromide and aluminum chloride are particularly useful in connection with this invention because of their relative cheapness and catalytic activity. In the further description of the invention specific reference will be made to anhydrous aluminum chloride. The invention includes within its scope, however, the use of other halides of aluminum such as aluminum bromide and as well other metal halides which are capable of catalyzing the isomerization of hydrocarbons.

Aluminum chloride is a highly active catalyst for the isomerization of hydrocarbons, but it is preferred to employ this material in combination with other relatively inactive materials which may be said to serve as supports for the aluminum chloride. The use of supporting materials in connection with aluminum chloride isomerization catalysts is desirable because of the relatively high vapor pressure of the aluminum chloride at the reaction temperature, which causes the catalyst to be carried from the reaction zone in the stream of reactants. A second reason for the desirability of a supporting material is the formation of complex oily materials as a result of side reactions of the hydrocarbons with the aluminum chloride. Such oily materials are adsorbed by the supporting material and are thus prevented from contaminating the catalyst or the product. A third reason for the desirability of supporting material for aluminum chloride isomerization catalysts is the relatively large surface which is presented to the reacting hydrocarbons by spreading the aluminum chloride throughout a larger catalytic mass.

We have found that carbon black is a highly valuable ingredient for metal halide catalysts employed in the isomerization of hydrocarbons. Carbon black employed in this invention in combination with a metal halide catalyst such as aluminum chloride may be any form of the material commonly referred to as carbon black, gas black, ebony black, jet black, satin gloss black, etc. Such materials are produced by the thermal decomposition, as by incomplete combustion, of a hydrocarbon gas. The carbon black employed in the process of this invention also may include materials produced by the decomposition of other hydrocarbons such as light hydrocarbon oils if the material thus produced either as such or after suitable treatment approximates gas black in physical properties and purity, particularly in freedom from hydrocarbons. In general, the term includes any carbonaceous material, having the essential properties of carbon black and produced by the thermal decomposition of hydrocarbons, which is sufficiently free from residual materials which are deleterious to the metal halide catalyst. As used in this description of the invention the term "carbon black" is intended to refer to carbonaceous materials thus defined and to distinguish the carbonaceous material employed in the present invention from other forms of carbon such as essentially residual materials like wood char and coke which have been treated, for example, by leaching, for the removal of adsorbed materials therefrom.

The carbon black may be combined with the aluminum chloride, or other suitable halide catalyst, as a mere physical mixture or, before use, the aluminum chloride and carbon black may be treated to effect adsorption of the former by the latter. It is sufficient, however, to charge the aluminum chloride and carbon black to the reactor as a simple mixture, or alternate quantities of the aluminum chloride and carbon black may be charged to the reactor to form therein alternate, relatively thin layers of the catalyst and supporting material. It is satisfactory to charge the catalytic material to the reactor as a simple mixture of ingredients since the aluminum chloride functions satisfactorily as a catalyst in that form, and such portions thereof as are vaporized by the passage of the hot reactants thereover are adsorbed by the carbon black and retained in use in the reactor. Apparently, vaporization and adsorption of the aluminum chloride in this manner proceeds during the conversion treatment until substantially all aluminum chloride charged to the reactor has been adsorbed by the carbon black. This results in substantial shrinkage of the body of catalytic material in the reactor during the operation.

In whatever form or manner the catalytic material is charged to the reactor it is desirable to include in the reactor, at the end thereof adjacent the exit for the reaction mixture, a substantial layer of carbon black having a relatively high adsorptive capacity for aluminum chloride For example, this portion of the reactor may be charged with carbon black substantially free from aluminum chloride. Thereafter during the conversion treatment aluminum chloride evolved elsewhere in the reactor, and not adsorbed from the reaction mixture prior to passage of the latter through the portion of the reactor adjacent the exit, is adsorbed by the layer of carbon black in that portion of the reactor and thus retained in the reactor and in effective use.

The relative proportions of carbon black and halide catalyst to be employed depend upon the character of the latter and the reaction conditions. In general any suitable ratio of halide catalyst to carbon black is employed which is sufficient to effect the desired hydrocarbon conversion reaction at the operating conditions selected. In general, it is desirable to employ as large a ratio of halide catalyst to carbon black which does not result in substantial loss of catalyst from the reactor by vaporization thereof.

With aluminum chloride it is feasible to employ satisfactorily ratios of the catalyst to carbon black as high as 1:1 without loss of aluminum chloride and when operating at temperatures sufficiently high to effect substantial isomerization of the hydrocarbons.

Contact of the catalytic material with the hydrocarbons undergoing treatment is brought about by any means previously indicated as feasible for the contact of fluid reactants with solid catalytic material and which provides the necessary conditions of temperature, pressure and time for effecting the desired hydrocarbon conversion. For example, the catalytic material may be maintained as one or more stationary masses through which the fluid hydrocarbon reactants are passed continuously as a stream.

The aluminum chloride and carbon black may be employed in any particle size. To assist in obtaining uniform mixing of the ingredients of the catalytic mass when they are charged to a reactor as a simple mixture it is desirable generally that they have particle sizes of the same order of magnitude. When the catalytic material is employed as a stationary mass through which the fluid reactants are passed as a stream it may be desirable to employ the aluminum chloride and carbon black in substantial particle sizes in order to restrict the pressure drop on the stream of reactants through the catalyst bed. Furthermore, the adsorption of aluminum chloride by the carbon black during the conversion treatment results in substantial shrinkage of the catalyst mass during the reaction. The employment of the catalyst mass in substantial particle size minimizes the variation in pressure drop through the catalyst bed during the reaction as a result of such shrinkage.

Since carbon black ordinarily is produced in a finely divided form it is desirable to convert it to a granular form prior to use. The size of the granules necessarily is dependent upon various conditions such as the pressure drop desired in the reactor, the granule size of aluminum chloride, etc. It has been found, however, that formation of the carbon black into granules of a size which will pass through a 4 mesh screen and be retained on an 8 mesh screen and the use of aluminum chloride of a similar granule size is satisfactory for use as the catalytic material in stationary catalyst masses of moderate size.

Formation of the finely divided carbon black into granules of larger size may be effected by any suitable means as by pelleting or by extrusion. In the formation of such relatively large granules it is desirable to add certain materials to the carbon black which assist in pelleting or extrusion or serve as binders in the finished granules. Such materials generally include inorganic compounds which are non-reactive with the halide catalyst or hydrocarbon reactants or other carbonaceous materials which are free from residues deleterious to the halide catalyst.

Inorganic materials suitable for use in granulating the carbon black include, in general, clays, various forms of silica, materials of like physical characteristics such as magnesium silicate, as in the form of asbestos flour. Clays which may be employed in the invention include natural clays such as Attapulgus clay and treated clays such as that marketed under the trade name "Super-Filtrol." Among the clays, however, it is found that bentonites as a group are superior to other forms for the purpose of the invention, apparently because of their tendency to contract on drying. A bentonite which has been found satisfactory for the purposes of the invention is a variety thereof marketed under the trade name "Volclay." In addition to clays silica gel and alumina gel also are suitable for the purpose.

Other carbonaceous materials satisfactory for use in combination with the carbon black are various tars which are capable of carbonizing without leaving residues deleterious to the halide catalyst, graphite, coke, and carbohydrates, such as sugar, capable of decomposing to leave a relatively pure carbonaceous residue.

While the list of materials suitable for use in combination with a carbon black is rather extensive, it is to be understood that the invention is not limited to the use of any particular material in combination with the carbon black, as the latter may be employed alone or in combination with any material which is satisfactory to assist in the granulation of the carbon black and is not deleterious to the halide catalyst or hydrocarbon reactants.

The proportions of carbon black and the additional material, hereinafter referred to as "binders," to be employed in the granulation of the carbon black depends somewhat upon the character of the binder and the size and strength desired in the carbon black granules. It is unnecessary, however, to employ binders in such proportion as to substantially alter the essential character of the carbon black. For example, with bentonite such as "Volclay" it is unnecessary to employ the binder in quantities greater than 20 to 25 per cent of the mixture of carbon black in the binder to form granules of substantial strength. 15 per cent of the "Volclay" is apparently satisfactory for all purposes, and under circumstances permitting the use of granules of lesser strength substantially smaller proportions of binder may be employed. For example, it may be desirable to employ quantities as low as 3 to 5 weight per cent of the total quantity of carbon black and binder. In general it is to be understood that the proportion of binder employed is not critical in the invention, and it is unnecessary to employ the binders in larger proportions than necessary to effect satisfactory granulation of the carbon black.

The hydrocarbons to be treated in accordance with this invention generally include paraffin and cycloparaffin hydrocarbons having four or more carbon atoms per molecule. Individual hydrocarbons, such as normal butane, may be treated to effect the production of the corresponding isomers, or narrow boiling fractions, such as the normally liquid fraction generally referred to as "refinery hexanes," may be treated to increase the proportion of branched-chain hydrocarbons therein. The process is applicable also to the treatment of mixtures of hydrocarbons containing constituents which are subject to the desired reaction such as wide boiling fractions of light or heavy naphtha, or natural gasoline.

The treatment of such fractions may be for the purpose of producing individual isomers of constituents of such fractions but ordinarily the relatively wide boiling fractions referred to are treated in accordance with the present invention to improve their properties for use as gasoline motor fuels or as blending materials for use in combination with other gasoline constituents. Under such circumstances the extent of the reaction resulting from the treatment of such fractions in accordance with this invention is determined by a comparison of the octane number of the product with that of the untreated materials.

The invention has particular application, however, to the treatment of individual hydrocarbons such as normal butane and normal pentane to produce corresponding isomers thereof. The conversion of normal butane to isobutane is of great commercial importance since isobutane is an essential ingredient for the preparation of iso-octane by alkylation thereof with butenes and is in addition a valuable starting material in the preparation of other hydrocarbon products. The invention is particularly valuable in the preparation of isobutane from normal butane because the catalytic material employed is highly active and stable under the necessary reaction conditions of temperature and pressure.

In carrying out the reaction the hydrocarbons are contacted with the catalytic material at temperatures from room temperature to 500° F., preferably 100° to 200° F. The hydrocarbons may be contacted with the catalytic material either in the liquid phase or as a vapor or gas. The pressure maintained on the reaction zone may vary within relatively wide limits. For operations involving a liquid phase the pressure may vary from that necessary to maintain the liquid phase conditions to substantially high superatmospheric pressures. In vapor or gas phase operations, however, relatively high pressures may be desirable. In the isomerization of normal butane to isobutane pressures of 200 to 2000 pounds per square inch, for example, 600 pounds per square inch may be employed.

The invention will be described further in connection with the isomerization of normal butane to isobutane by the use of catalytic material of the present invention, including carbon black granulated with "Volclay" as a binder. It is to be understood, however, that the invention is not limited to the treatment of any particular hydrocarbon by such specific example but is applicable in general to the treatment of aliphatic and cyclic paraffin hydrocarbons as described above. It is to be understood also that the references to the use of "Volclay" as a binder in the granulation of the carbon black represent merely an example of the use of bentonites in particular and clays in general. It is to be understood, furthermore, that the reference to a particular clay in the following examples is not intended to limit the invention to the use of any particular binder with the carbon black.

Example I 4 parts by weight of carbon black and 1 part by weight of "Volclay" were mixed in the presence of sufficient water to form an extrudable mixture. The resulting mixture was extruded into rods approximately ¼ inch in diameter, and the rods thus obtained were dried at 300° F. The dried rods were then crushed to form a granular mixture from which granules passing a 4 mesh screen but retained by an 8 mesh screen are separated for use. The granular supporting material thus produced was mixed with an equal part by weight of anhydrous aluminum chloride of the same granule size, and the resulting physical mixture was charged to a suitable reactor. A feed consisting of 90 per cent normal butane and 10 per cent hydrogen chloride was passed through the reactor under a pressure of 600 pounds per square inch at a space velocity of .4 to .45 volumes of normal butane (liquid basis) per volume of catalyst space per hour (or .15 to .2 gallon of normal butane per hour per pound of aluminum chloride). The temperature in the reactor was raised gradually to 150° F. at which point the hydrocarbon product contained 33 to 35 weight per cent of isobutane. Thereafter the operating temperature was increased periodically to a maximum temperature of 250° F. During this operating run isobutane was produced in an amount equal to over 17 gallons per pound of aluminum chloride employed.

Example II

Carbon black was granulated in accordance with the general procedure of Example I except that the extruded rods were dried at 500° F. The granulated carbon black thus prepared was mixed with aluminum chloride of the same mesh size but in a ratio of 3 parts of supporting material to 2 parts of aluminum chloride. A feed consisting of 90 per cent normal butane and 10 per cent hydrogen chloride was passed through the reactor under a pressure of 600 pounds per square inch at a space velocity of .4 to .45 volume of normal butane (liquid basis) per volume of catalyst space (or .17 to .22 gallon of normal butane per pound of aluminum chloride per hour). The reaction temperature was increased gradually to 130° F., at which condition the hydrocarbon reaction product contained 20 to 22 weight per cent of isobutane. After 18 hours' operation of the reactor at 130° F., at which time the operation had produced approximately 2.25 gallons of isobutane per pound of aluminum chloride charged to the reactor, a second reactor similar in the quantity and quality of catalytic material employed to the first reactor was introduced into the system, and the total product of the first reactor was charged directly to the second reaction. The temperature of the second reactor was increased gradually to 130° F. at which time the hydrocarbon product issuing from the second reactor contained approximately 35 weight per cent of isobutane. The operation was continued thereafter with both reactors at a temperature of 130° F. In this stabilized operation the normal butane charged to the first reactor was converted to a hydrocarbon product containing 20 to 24 weight per cent of isobutane, and this hydrocarbon product was further converted in the second reactor to a final hydrocarbon product containing 33 to 35 weight per cent of isobutane. At the end of 954 hours of the operating run there had been produced in the first reactor, without any substantial loss of activity, a total of 33.0 gallons of isobutane per pound of aluminum chloride charged to that reactor. At the same time there had been produced in the second reactor, without substantial loss of activity, a total of 17.0 gallons of isobutane per pound of aluminum chloride charged to that reactor.

As indicated above, a single reactor may be employed, or the reaction mixture may be passed through a series of reactors arranged in any suitable manner. In example II above the reaction mixture was passed to the reactor in a countercurrent manner, that is, the reaction mixture was passed first through the reactor which had been on stream longest. However, the invention is not limited to such an arrangement but includes also a passage of the reaction mixture through a series of reactors in a concurrent manner whereby the fresh feed is introduced first to the freshest reactor.

It is desirable to introduce into the reaction zone as an activator one or more hydrogen halides. The presence of such an activator in the reaction zone may be brought about, as in the foregoing examples, by its direct introduction with the fresh feed, or by the inclusion of a small quantity of water vapor in the feed which reacts with the halide catalyst to form the corresponding hydrogen halide. While the latter method and the method of the examples involve the use of the hydrogen halide corresponding to the halide catalyst such correspondence is not essential. For example, any of the hydrogen halides such as hydrogen chloride, hydrogen bromide and hydrogen fluoride may be employed to activate the metal halide such as aluminum chloride or aluminum bromide.

The reaction temperature varies from room temperature to 500° F., depending upon the character of the material being processed. For any particular fresh feed the temperature may vary somewhat within this range with variations in the space velocity employed. With relatively high space velocity a relatively high temperature must be employed to attain maximum conversion. However, it may be desirable to employ a relatively low temperature in connection with relatively low space velocity to obtain maximum yield of product per unit quantity of aluminum chloride employed. For example, in the isomerization of normal butane it is found beneficial to maintain the reaction temperature below about 150° F. while maintaining the space velocity sufficiently low to effect the desired degree of conversion of normal butane to isobutane. This method of operation results apparently in maximum catalyst life with maximum yield of isobutane per unit quantity of aluminum chloride employed.

The invention has been described with particular reference to the treatment of normal butane to effect conversion thereof to isobutane. It is to be understood, however, that the invention is applicable also to the treatment of other hydrocarbons or mixtures of hydrocarbons to effect isomerization thereof. For example, normal pentane or normal hexane may be treated similarly with suitable adjustments of the reaction conditions in accordance with the different character of the charge. Furthermore, the invention is applicable also to the treatment of mixtures of hydrocarbons to effect isomerization of one or more ingredients thereof. The invention, furthermore, is applicable to the treatment of various naphthas and gasolines to improve the octane value thereof by effecting isomerization of straight-chain or slightly branched-chain constituents thereof to branched-chain or more highly branched-chain products.

We claim:

1. A process for isomerizing hydrocarbons of the group consisting of paraffin and cycloparaffin hydrocarbons which comprises contacting said hydrocarbons at elevated temperature with a non-gaseous metal halide isomerizing catalyst in combination with supporting material comprising a plurality of film granules each consisting essentially of at least 75% of finely divided carbon black intimately mixed with a minor proportion of a finely divided binder material.

2. A process for isomerizing hydrocarbons of the group consisting of paraffin and cycloparaffin hydrocarbons which comprises contacting said hydrocarbons at elevated temperature with a non-gaseous metal halide isomerizing catalyst in combination with supporting material comprising a plurality of firm granules each consisting essentially of at least 75% of finely divided carbon black intimately mixed with a minor proportion of a finely divided clay binder.

3. A process for isomerizing hydrocarbons of the group consisting of paraffin and cycloparaffin hydrocarbons which comprises contacting said hydrocarbons at elevated temperature with a non-gaseous metal halide isomerizing catalyst in combination with supporting material comprising a plurality of firm granules each consisting essentially of at least 75% of finely divided carbon black intimately mixed with a minor proportion of a finely divided bentonite binder.

4. A process for isomerizing hydrocarbons of the group consisting of paraffin and cycloparaffin hydrocarbons which comprises contacting said hydrocarbons at elevated temperature with anhydrous aluminum chloride in combination with supporting material comprising a plurality of firm granules each consisting essentially of at least 75% of carbon black intimately mixed with a minor proportion of a finely divided binder material.

5. A process for isomerizing hydrocarbons of the group consisting of paraffin and cycloparaffin hydrocarbons which comprises contacting said hydrocarbons at elevated temperature with a non-gaseous metal halide isomerizing catalyst in combination with supporting material comprising a plurality of firm granules each consisting of approximately 85% of finely divided carbon black intimately mixed with approximately 15% of finely divided bentonite binder.

6. A process for isomerizing hydrocarbons of the group consisting of paraffin and cycloparaffin hydrocarbons which comprises contacting said hydrocarbons at elevated temperature with a consolidated mass of firm catalyst granules each consisting of at least 75% of carbon black and not more than 25% of a binder and having adsorbed thereon a substantial proportion of anhydrous aluminum chloride.

7. A process for isomerizing hydrocarbons of the group consisting of paraffin and cycloparaffin hydrocarbons which comprises contacting said hydrocarbons at elevated temperature with a consolidated mass of firm catalyst granules each consisting of at least 75% of finely divided carbon black intimately mixed with a minor proportion of finely divided bentonite binder and having adsorbed thereon a substantial proportion of anhydrous aluminum chloride.

ERNEST SOLOMON.
HERBERT J. PASSINO.
LOUIS C. RUBIN.